United States Patent
Walker

(10) Patent No.: US 7,172,233 B2
(45) Date of Patent: *Feb. 6, 2007

(54) MOTORIZED EXTENSIBLE WIND SHIELD VISOR

(76) Inventor: Delores D. Walker, 10326 Bon Oak Dr., St. Louis, MO (US) 63136

( * ) Notice: Subject to any disclaimer, the term of this patent is extended or adjusted under 35 U.S.C. 154(b) by 0 days.

This patent is subject to a terminal disclaimer.

(21) Appl. No.: 11/261,736

(22) Filed: Oct. 28, 2005

(65) Prior Publication Data

US 2006/0066128 A1    Mar. 30, 2006

Related U.S. Application Data

(63) Continuation-in-part of application No. 10/646,001, filed on Aug. 22, 2003.

(51) Int. Cl.
*B60J 11/00* (2006.01)

(52) U.S. Cl. .............. 296/95.1; 296/97.1; 160/370.21; 135/88.07

(58) Field of Classification Search .............. 296/95.1, 296/97.1, 99.1; 160/370.21, DIG. 3; 135/88.05, 135/88.07

See application file for complete search history.

(56) References Cited

U.S. PATENT DOCUMENTS

| | | | | |
|---|---|---|---|---|
| 2,518,903 A * | 8/1950 | Tedstrom et al. | ........... | 242/318 |
| 2,570,399 A * | 10/1951 | Henry | ........................ | 296/95.1 |
| 3,088,772 A * | 5/1963 | Francis | ...................... | 296/95.1 |
| 3,279,845 A * | 10/1966 | Lutz | .......................... | 296/95.1 |
| 4,229,035 A * | 10/1980 | Newman | .................... | 296/95.1 |
| 4,848,827 A * | 7/1989 | Ou | ............................. | 296/99.1 |
| 4,950,020 A * | 8/1990 | Chen | ........................ | 296/95.1 |
| 6,276,742 B1 * | 8/2001 | Deng et al. | ................ | 296/95.1 |
| 6,425,623 B2 * | 7/2002 | Nakayama | ................. | 296/95.1 |

\* cited by examiner

*Primary Examiner*—Joseph D. Pape
(74) *Attorney, Agent, or Firm*—Charles McCloskey

(57) ABSTRACT

The visor joins to the roof of a motor vehicle to deflect heavy precipitation, such as a downpour, from a windshield. The visor is a permanent motorized device with a hollow planar cover. The cover contains a means to extend and retract the visor from the cover and over the windshield. The extension and retraction means is a spring balanced motorized cable and pulley system. The cable attaches to the rear of the visor and the visor has rollers in tracks for extending and retracting from the cover. A driver presses the switch to extend the visor as the motor unwinds the cable and the springs relax. When a downpour passes, the driver presses the switch to retract the visor as the motorized system reverses. The visor reduces vision impairment of drivers caused by precipitation.

9 Claims, 3 Drawing Sheets

MOTORIZED EXTENSIBLE WIND SHIELD VISOR

CROSS-REFERENCE TO RELATED APPLICATION

This continuation-in-part application claims the benefit of application Ser. No. 10/646,001, filed Aug. 22, 2003 and commonly owned by the same inventor. The above noted application is incorporated herein by reference.

BACKGROUND OF THE INVENTION

The present invention relates to a roof mounted automotive accessory in general and more particularly to a motorized extensible visor to protect the vision of a driver during inclement weather. This visor also shades a vehicle windshield from the sun.

From time to time, nature provides downpours, thunderstorms, and hurricanes that affect drivers. In such storms, a sudden massive volume of rain besets drivers. Presently, drivers resort to use of their windshield wipers for removing rain that obscures their vision. Windshield wipers remove rain until the volume of rain exceeds their wiping capacity. In extreme downpours, drivers slow or stop their vehicles causing traffic delays that contribute to accidents.

Nature also provides other precipitation and people use other vehicles. Snow and ice also accumulate on vehicles and can block the driver's vision. Snow piles upon windshields when it falls and drivers then brush it off. In heavier snowfalls and blizzards, the falling snow exceeds the ability of wipers to remove it. Then ice glazes vehicles particularly windshields and drivers scrape it off. As people go about everywhere, people use cars, trucks, boats, and equipment. Trucks, boats, and equipment also encounter the same weather as cars. Boats also encounter freshwater and seawater sprayed upon the boat, particularly the bridge. Water sprayed upon the bridge impairs the vision of boat operators. Equipment, such as snow cats, earthmovers, and logging skidders also withstand snow, earth, and tree debris. Such earth and debris also impair the vision of equipment operators.

DESCRIPTION OF THE PRIOR ART

Over time, various visors have sought to protect the vision of drivers. Visors have extended from the roofs of vehicles in various ways with modest success in maintaining the vision of drivers during inclement weather.

The patent to Nakayama, Pat. No. 6,425,623 shows a retractable visor for an automobile windshield. The visor housing mounts to a roof and occupies nearly the entire roof. In one embodiment, the visor has a spring at the rear and a cable system on the hood to extend the visor. In another embodiment, the patent shows the visor extending downward from a housing. The visor and housing have complementary arcuate shapes. In contrast, the present invention has a motorized visor that extends upward and above the windshield of an automobile. When stored, the present invention also covers a minor portion of the windshield and less than the entire roof unlike the '623 patent.

The present invention overcomes the limitations of the prior art explained above. That is, the art of the present invention allows motorized extension and retraction of a visor upon the roof of an automobile. The visor extends forward and upward of the windshield to collect and remove rain from a driver's field of vision.

SUMMARY OF THE INVENTION

The windshield visor can be used on any motor vehicle such as a car, van, bus, or the like. The present invention serves as a safety device to improve the visibility for the driver during heavy rainstorms or inclement weather. In use, the visor of the present invention protects the windshield from excessive rain, hail, sleet and the like. The present invention clears the view of the road for a driver and lowers the risk of accidents due to impaired visibility. Further, the present invention lowers the need for drivers to pull off the road during inclement weather.

The present invention joins to the roof of a motor vehicle or automobile as a permanent motorized device. The present invention has a hollow planar cover and, towards the rear of the cover, a motor and shaft attach on the inside of the cover. A cable extends from the shaft towards the visor stored within the cover. A matched pair of springs extend from the rear edge of the visor to a bar ahead of the shaft. The bar extends laterally to the interior sides of the cover for mounting. The cable passes over the bar and towards the cover. The cover has pairs of rollers on each side. The rollers engage a track upon the interior sides of the cover ahead of the bar. Electrical power and controls proceed from the motor to the dashboard upon the interior of the automobile. In use, a driver presses the controls to extend the visor and the motor turns to unwind the cable as the springs relax. When the cable stops, the visor has reached the extended position. When the downpour passes, the driver presses the controls to retract the visor. The motor turns in the opposite direction and winds the cable, pulling the visor into the cover as the visor moves along the track.

Further, the visor resists wind encountered during operation of an automobile. However, the present invention does not replace windshield wipers. Windshield wipers accommodate normal rain. Windshield wipers in conjunction with the present invention accommodate heavier precipitation, or a downpour. In general, the present invention reduces vision impairment of drivers caused by excessive rainfall upon a windshield during downpours, thunderstorms, hurricanes, and the like.

There has thus been outlined, rather broadly, the more important features of the invention in order that the detailed description thereof that follows may be better understood and that the present contribution to the art may be better appreciated. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a new and improved motorized windshield visor.

Another object is to provide such a motorized windshield visor that is readily assembled and installed upon an automobile roof or another vehicle.

A further object is to provide such a motorized windshield visor that retracts and extends as desired by a driver along with the local weather.

A still further object is to provide such a motorized windshield visor that resists the wind and other aerodynamic forces when in usage.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

The same reference numerals refer to the same parts throughout the various figures.

DESCRIPTION OF THE PREFERRED EMBODIMENT

Figure 1:
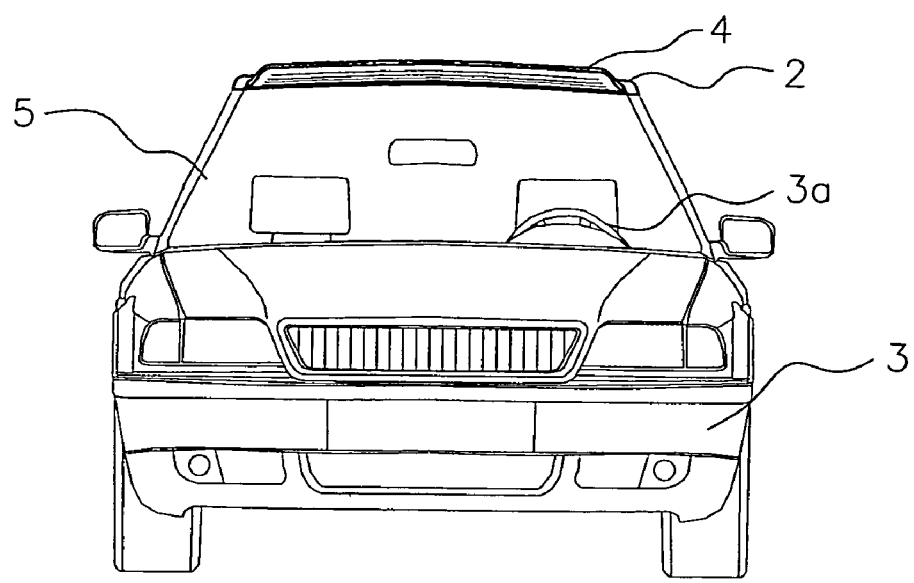
FIG. 1 shows a front view of an automobile with the present invention extended.
Figure 2:
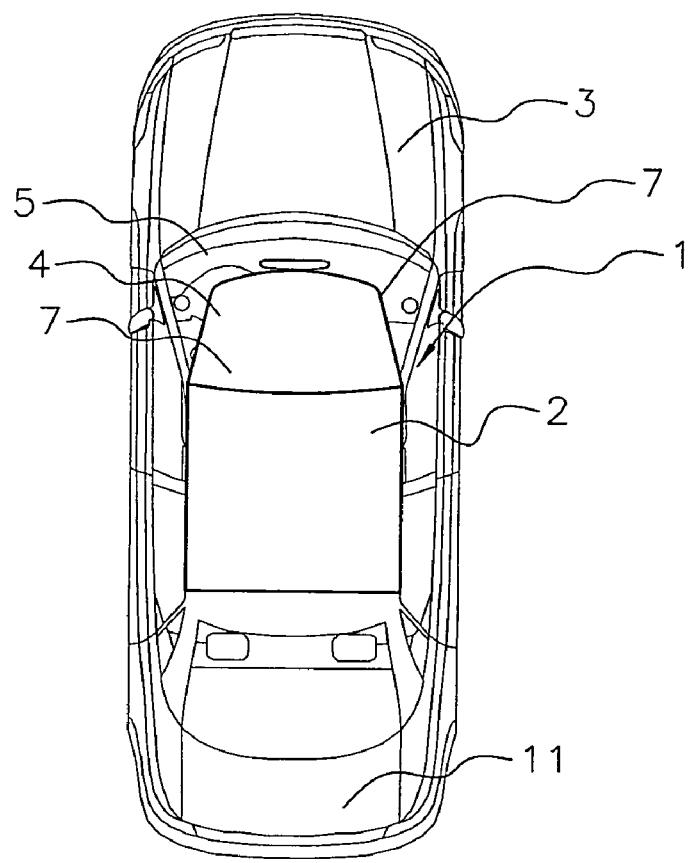
FIG. 2 describes a top view of an automobile with the present invention installed and extended.
Figure 3:
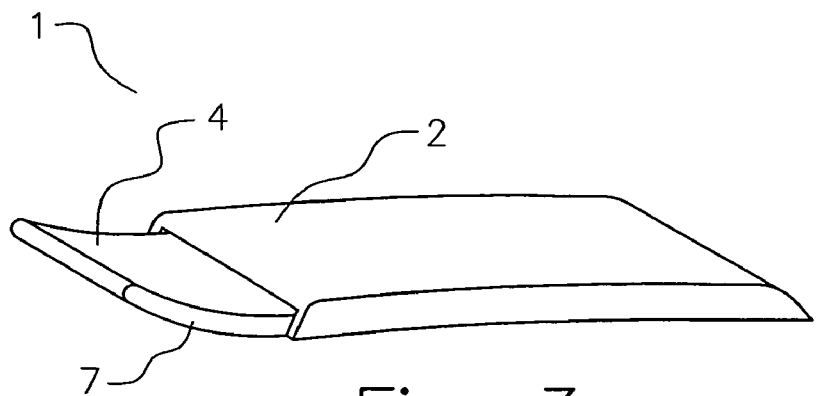
FIG. 3 shows an isometric view of the cover with the visor extended.

In the preferred embodiment, the present invention 1 is a remotely operated, retractable unit with a cover 2 located on top of a vehicle or car 3, which holds the visor 4 as shown in FIG. 1. Retraction and extension of the visor is controlled electrically via steering column or dashboard access 3a. The preferred embodiment will extend for the width of the roof and partially along the length of the roof. The visor 4 has a width that of the windshield 5 to span it completely and block downpours, sleet, or the like as shown in FIG. 2. The visor extends out and over the windshield at least 6 to 18 inches. The visor 4 will curve upward about 2½ inches to direct heavy rain rearward and to the side of the windshield 5 and away from the view of the driver as shown in FIG. 3. The shape and dimensions of the visor make for an aerodynamic shape. The visor resists tearing off by wind and limits the effect on vehicle fuel mileage. FIG. 3 shows the present invention with the visor in usage in the extended position, approximately 12 inches and also curving upwards.

Figure 4:
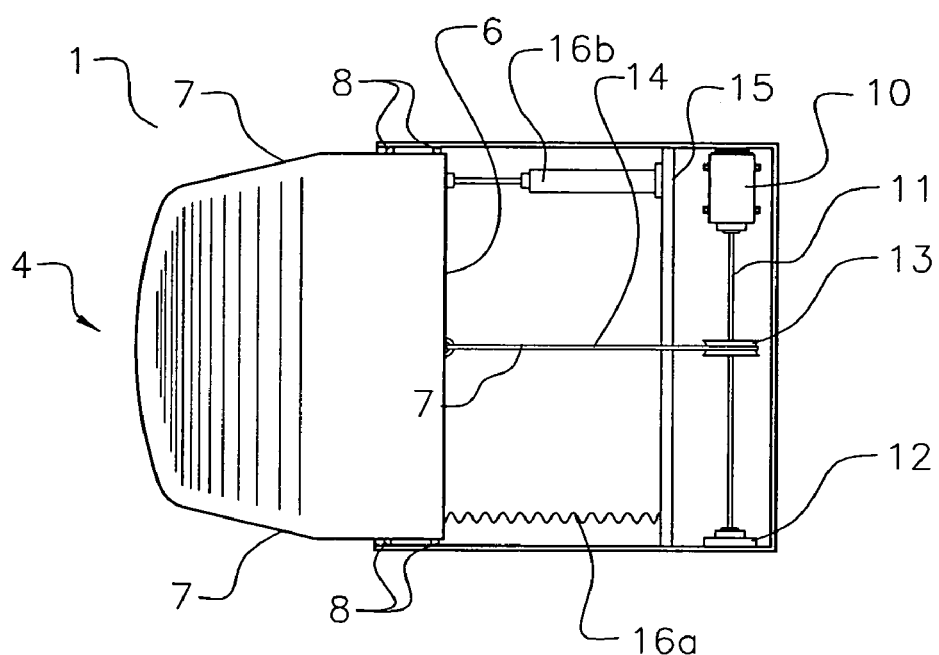
FIG. 4 has a bottom view of the present invention that illustrates the motive components therein.
Figure 4A:
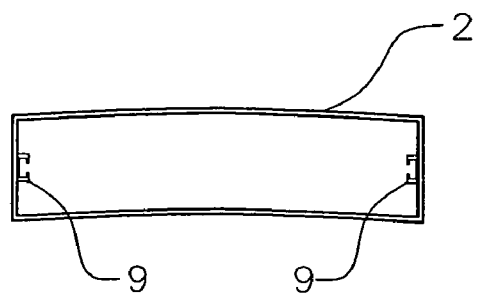
FIG. 4a shows an end view of the cover with tracks installed inside the cover; and, FIG. 5 shows a side view of an automobile with the present invention retracted.

FIG. 4 then shows a bottom view of the present invention. The present invention has a hollow cover 2, here shown to the right of the visor 4. The visor has a trapezoidal shape in plan view that curves gently upwards. Upon the rear 6 of the visor, the visor has a generally rectangular shape with two parallel spaced apart edges 7. Upon each edge, the visor has two spaced apart rollers 8. The rollers engage a track 9 mounted upon the inside of the walls of the cover. The rollers move along the track as the visor extends and retracts from the cover. The use of two rollers upon each edge prevents the visor from tipping during usage.

The visor extends and retracts using a motor 10 and related parts. The motor is located within the cover at the rear, generally towards a corner. The motor rotates a shaft 11 either in a clockwise or a counterclockwise direction. The shaft extends across the width of the cover and rests within a journaled bearing 12. Generally centered upon the shaft, a pulley 13 plays out and winds a cable 14 extending perpendicular to the shaft. The cable spans from the pulley to the rear of the visor. Slightly ahead of the pulley, a bar 15 spans across the width of the cover and joins to both sides of the cover. The previously described cable passes over the bar. From the bar, two springs 16a extend and reach the rear of the visor. The springs are mutually parallel and spaced apart, generally outside of the cable. The springs have a length and stiffness that combine to provide the motive force for the visor. To extend the visor, a driver activates the motor by the switch 3a which rotates the shaft that turns the pulley to play out the cable. As the cable lengthens, the springs return towards their full length thus allowing the visor to advance over the windshield. To retract the visor, a driver activates the motor by a switch 3a in the opposite direction which turns the shaft mounted pulley to wind the cable. Winding of the cable pulls the visor into the cover as the springs compress. When the visor is retracted or extended to the desired position, the driver releases the switch 3a that controls the motor. Alternatively, gas charged cylinders 16b extend from the rear of the visor to the bar.

Figure 5:
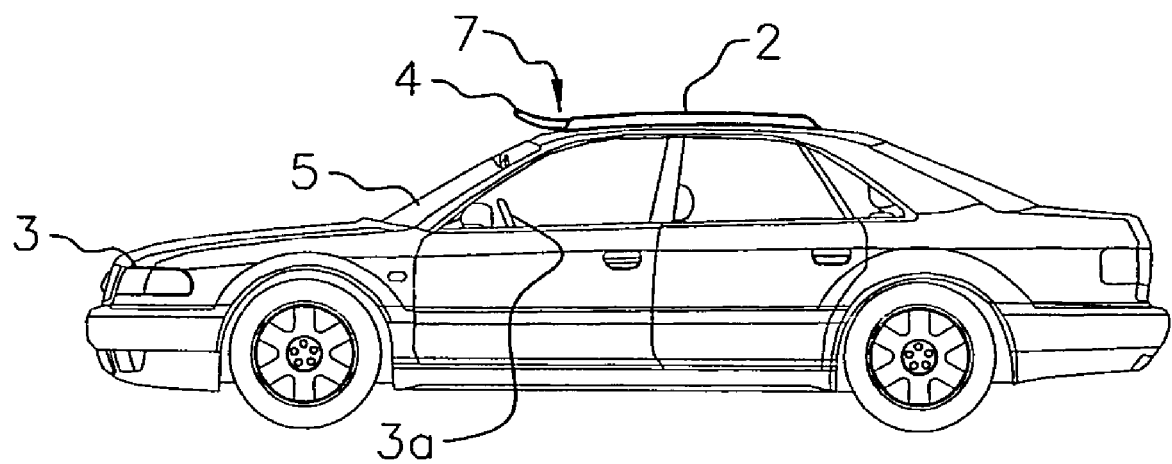

FIG. 5 then shows the present invention 1 in the retracted position after the driver presses a switch that supplies the power to the motor to wind the cable which retracts the visor into the cover. As the visor has an upturned shape similar to an inverted umbrella, the leading edge or front of the visor remains outside of the cover. The leading edge has minimal aerodynamic affects on the car while retaining a curvature to direct water away from the windshield.

Additionally, the present invention can also be used as a sun shade. The driver presses a switch to extend the visor from the cover over the windshield. As a sun shade, the visor reduces the amount of sunlight that enters the windshield. In doing so, the visor reduces the heat and ultraviolet light entering the area of the front seats of an automobile. When extended, the visor lowers the temperature of the passenger compartment keeping it from overheating and reduces degradation of the dashboard from excessive sunlight.

From the aforementioned description, an automobile windshield visor has been described. The windshield visor is uniquely capable of diverting heavy rain away from a windshield of an automobile while retracting within a cover for storage. The windshield visor and its various components may be manufactured from many materials including but not limited to polymers, high density polyethylene HDPE, polypropylene PP, polyvinyl chloride PVC, nylon, ferrous and non-ferrous metals, their alloys, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device to divert rainwater from a vehicle windshield comprising:

a visor, generally trapezoidal in shape and extending above and upwardly from said windshield, and having a front and an opposite rear wider than said front;

a cover for storing said visor adapted to be installed upon the roof of the vehicle, having a front located towards the windshield, an opposite rear, and two longitudinal sides; and, means to extend and retract said visor out from and into said cover upon command of a driver of a vehicle as needed due to the weather.

2. The device to divert rainwater of claim 1 further comprising:

said visor extending above the roof of the vehicle and extending outward from the joint of the roof and the windshield of the vehicle.

3. The device to divert rainwater of claim 1 further comprising:

said extending and retracting means having a motor, a shaft extending from said motor, a pulley generally centered upon said shaft, a cable connected to said pulley and to said rear of said visor, a bar spanning across said cover proximate to said shaft, at least two springs spanning from said bar to said rear of said visor, and a switch for controlling said motor located proximate to a driver within the vehicle;

said cover having a track located interiorly of each longitudinal side, said tracks extend from said bar forwards; and, said visor having along each side at least two spaced apart rollers traveling in said tracks.

4. The device to divert rainwater of claim 1 further comprising:

said extending and retracting means locating within said cover, operatively connecting to said visor, and being controlled by a driver of the vehicle;

said visor sliding within said cover upon said longitudinal sides as required by said driver.

5. The device to divert rainwater of claim 1 further comprising:

said visor curving upward at least two inches above the plane of the roof of a vehicle, extending outward at least six inches from the joint of the roof and the windshield of the vehicle, and having a generally curved cylindrical shape.

6. The device to divert rainwater of claim 1 further comprising:

said extending and retracting means having a motor, a shaft extending from said motor, a pulley generally centered upon said shaft, a cable connected to said pulley and to said rear of said visor, a bar spanning across said cover proximate to said shaft, at least two cylinders spanning from said bar to said rear of said visor, and a switch for controlling said motor located proximate to a driver within the vehicle;

said cover having a track located interiorly of each longitudinal side, said tracks extend from said bar forwards; and, said visor having along each side at least two spaced apart rollers traveling in said tracks.

7. A device to divert rainwater from a vehicle windshield comprising:

an aerodynamically shaped visor extending upwardly from said windshield and having two spaced apart sides and at least two spaced apart rollers upon said sides;

a cover for storing said visor adapted to be installed upon the roof of the vehicle, having a front located towards the windshield, an opposite rear, two longitudinal sides, and two tracks locating interiorly of each longitudinal side;

a motor, a shaft extending from said motor, a pulley generally centered upon said shaft, a cable connected to said pulley and to the rear edge of said visor, a bar spanning across said cover proximate to said shaft, at least two springs spanning from said bar to said rear of said visor; and, a switch for controlling said motor located proximate to a driver within the vehicle and allowing a driver within the vehicle to extend and retract said visor out from and in to said cover as needed due to the weather.

8. The device to divert rainwater of claim 7 further comprising:

said visor curving upward at least two inches above the plane of the roof of a vehicle and extending outward at least six inches from the joint of the roof and the windshield of the vehicle and having a generally curved cylindrical shape.

9. A device to divert rainwater from a vehicle windshield comprising:

an aerodynamically shaped visor extending upwardly from said windshield and having two spaced apart sides and at least two spaced apart rollers upon said sides;

a cover for storing said visor adapted to be installed upon the roof of the vehicle, having a front located towards the windshield, an opposite rear, two longitudinal sides, and two tracks locating interiorly of each longitudinal side;

a motor within said cover, a shaft extending from said motor, a pulley generally centered upon said shaft, a cable connected to said pulley and to said rear of said visor, a bar spanning across said cover proximate to said shaft, at least two cylinders spanning from said bar to the rear edge of said visor; and, a switch for controlling said motor located proximate to a driver within the vehicle and allowing a driver within the vehicle to extend and retract said visor out from and in to said cover as needed due to the weather.

* * * * *